United States Patent
Yoneyama et al.

(10) Patent No.: US 8,278,602 B2
(45) Date of Patent: Oct. 2, 2012

(54) HEATING ELEMENT FOR STEERING WHEEL

(75) Inventors: Mitsuru Yoneyama, Nara (JP); Naohito Asami, Nara (JP); Akira Shiratake, Nara (JP); Norio Abe, Kanagawa (JP); Kazumi Nagayama, Nara (JP)

(73) Assignee: Panasonic Corporation, Osaka (JP)

( * ) Notice: Subject to any disclaimer, the term of this patent is extended or adjusted under 35 U.S.C. 154(b) by 670 days.

(21) Appl. No.: 12/111,009

(22) Filed: Apr. 28, 2008

(65) Prior Publication Data

US 2008/0210048 A1    Sep. 4, 2008

Related U.S. Application Data

(62) Division of application No. 10/420,738, filed on Apr. 23, 2003, now abandoned.

(30) Foreign Application Priority Data

Apr. 25, 2002  (JP) ................................. 2002-124014
Jul. 30, 2002  (JP) ................................. 2002-221002

(51) Int. Cl.
*B62D 1/06* (2006.01)
*H05B 3/34* (2006.01)

(52) U.S. Cl. ........ 219/204; 219/494; 219/497; 219/528; 219/543; 219/552; 74/552

(58) Field of Classification Search .................. 219/204, 219/494, 497, 528, 543, 544, 545, 552; 74/552; 74/558

See application file for complete search history.

(56) References Cited

U.S. PATENT DOCUMENTS

| 2,652,476 A | 9/1953 | Di Langiano |
| 2,772,338 A * | 11/1956 | Crowley ....................... 219/504 |
| 4,547,655 A | 10/1985 | Kurata et al. |
| 4,631,976 A | 12/1986 | Noda et al. |
| 4,698,488 A | 10/1987 | Kishimoto |
| 4,983,814 A | 1/1991 | Ohgushi et al. |
| 5,206,485 A | 4/1993 | Srubas et al. |

(Continued)

FOREIGN PATENT DOCUMENTS

EP    0 437 641 A1    7/1991

(Continued)

OTHER PUBLICATIONS

Chinese Office Action issued Jan. 9, 2009 in Chinese Application No. 03122529.2 (with English translation).

*Primary Examiner* — Tu B Hoang
*Assistant Examiner* — Brian Jennison
(74) *Attorney, Agent, or Firm* — Wenderoth, Lind & Ponack, L.L.P.

(57) ABSTRACT

A heating element includes a base material and a heater disposed on the base material, which can be deformed to accommodate a part of the heater. A steering wheel equipped with the heating element is free from surface protrusions caused by the heater. Employment of a linear heater reduces connections between the heater and power supply lines, and a high connecting reliability is obtained. The steering wheel includes the heating element and the power lines, and connections between the heating element and the power lines are disposed in the boss portion of the steering wheel. The steering wheel is further provided with a temperature detector, a temperature detector heater and a temperature controller, and the detector and the detector heater are disposed in the boss portion. Thus, a steering wheel with a good grip and a good appearance can be provided at a low cost.

10 Claims, 9 Drawing Sheets

U.S. PATENT DOCUMENTS

| | | | |
|---|---|---|---|
| 5,676,872 A | 10/1997 | Garcia-Rodriguez | |
| 6,326,593 B1 | 12/2001 | Bonn et al. | |
| 6,365,875 B1 | 4/2002 | Kreuzer et al. | |
| 6,392,195 B1 | 5/2002 | Zhao et al. | |
| 6,509,552 B1 * | 1/2003 | Roske et al. | 219/497 |
| 6,512,202 B2 | 1/2003 | Haag et al. | |
| 6,710,313 B1 * | 3/2004 | Asami et al. | 219/549 |
| 2002/0043525 A1 * | 4/2002 | Laken et al. | 219/386 |

FOREIGN PATENT DOCUMENTS

| | | |
|---|---|---|
| EP | 0 437 641 B1 | 9/1993 |
| JP | 60-15262 | 1/1985 |
| JP | 61-81273 | 4/1986 |
| JP | 4-15162 | 1/1992 |
| WO | 99/39964 | 8/1999 |
| WO | WO 0121044 A1 * | 3/2001 |

* cited by examiner

HEATING ELEMENT FOR STEERING WHEEL

This is a divisional of U.S. patent application Ser. No. 10/420,738, filed Apr. 23, 2003 now abandoned.

BACKGROUND OF THE INVENTION

1. Field of the Invention

The present invention relates to a heating element for use in a steering wheel of an automobile, a motor boat or the like, as well as to a steering wheel equipped with the heating element.

2. Background Art

For the comfort of those who drive automobiles, motor boats and the like in cold areas, steering wheels with heating elements have been put into practical use.

Some of the conventional heating elements for this application have been disclosed in, for example, Japanese Patent Laid-Open Application No. H4-15162, and Japanese Patent Laid-Open Application No. S61-81273, which are shown in FIG. 14 and FIG. 15.

A heating element 1 as shown in FIG. 14 comprises a heater 2 formed of a vertical knit stretch fabric, a textile 3 hemming the heater edge, and a connection wire 4 stretching to cover the entire width of the heater 2 for connecting the heater 2 with a power supply. Heating element 1 has been bonded to a cover 5 of a steering wheel.

A steering wheel 31 as shown in FIG. 15 comprises a core 32, a heat insulator 33 covering the core 32, and a heating element 34 is disposed on the outer periphery of heat insulator 33. The heating element 34 comprises a heater wire 35 and a power supply wire 36, and the power supply wire 36 supplies electric power. A connection 37 connecting the heater wire 35 with the power supply wire 36 is disposed at a rear part of a spoke 31a. A thermistor 38 for detecting the temperature of heating element 34 is disposed in a ring portion 31b. All these elements are covered with a steering wheel cover 39.

However, in the structure as shown in FIG. 14, where heating element 1 is bonded directly to a thin cover 5 of a synthetic resin sheet or a leather, fine heaters 2 of heating element 1 cannot withstand a heavy load. On the other hand, thick heaters 2 readily generate protrusions on a surface of the cover 5. This is a problem with the conventional heating elements.

Another problem is that, since the heater 2 is formed of a stretch fabric, connection wire 4 needs to be provided to cover the entire width of heater 2. Namely, there are quite a number of connection points, and it is difficult to connect all of the connection points without fail. This leads to a problem of low reliability.

Still another problem is that, although the edge is hemmed with a textile 3, the remainder of the heater 2 remains stretchable. So, the heater 2 may expand to a larger size when it is bonded to the cover 5, and it is not easy to attach it properly on the cover 5. Moreover, connection of heater 2 with connection line 4 is not an easy operation.

In a steering wheel as shown in FIG. 15, a connection 37 is disposed on the reverse surface of the spoke 31a. This creates a protrusion on the surface of the steering wheel 31. The thermistor 38 is disposed in the ring portion 31b, and is also a cause of a protrusion on the surface of the steering wheel 31. The protrusions are not only uncomfortable to a driver handling the steering wheel, but they provide a disadvantage with respect to the appearance of the steering wheel.

Furthermore, the thermistor 38 detects different temperatures depending on whether a driver is gripping the steering wheel in a vicinity of the thermistor 38 or not. Therefore, stable temperature control can not be expected.

If the core 32 is provided with recesses for housing the connection 37 and the thermistor 38 in order to improve the driver's feeling and appearance of the steering wheel, the core 32 needs to be provided with different designs depending on whether the steering wheel will include a heating element. In other words, the core 32 cannot be of a certain standard design cannot be of a certain standard design that is common for the production of all steering wheels, and this leads to a difficulty in providing steering wheels at a low cost.

The present invention addresses the above-described problems and aims to provide a heating element for steering wheels which does not generate a protrusion on the surface of the cover material due to the presence of a heater, a connection or the like constituent members. The heating element also has high durability and high reliability in the connection between the connection wire and the heater, and can be attached easily to a steering wheel. The present invention also provides a steering wheel equipped with the heating element.

A steering wheel in accordance with the present invention does not give any uncomfortable feeling to a driver handling the steering wheel, and has a good appearance. Furthermore, cores of a certain standard design can be used in common for the production of all steering wheels, regardless of the existence of the heating element. Thus an inexpensive steering wheel can be provided.

SUMMARY OF THE INVENTION

A planar heating element in accordance with the present invention comprises a base material and a heater disposed on the base material, and a shape of the base material can be deformed so that at least part of the heater is sunk therein.

In accordance with a structure of the present invention, a protrusion of the heater at a surface of a cover of a steering wheel can be avoided even if a thick heater is used. This means that a thick heater can be used to provide an increased durability against load. Furthermore, when a linear heater is employed, the number of connections between the heater and a power supply can be reduced, and the connection reliability is improved.

A steering wheel in accordance with the present invention comprises the above-described heating element and a power supply line for supplying electric power to the heating element. The connections connecting the heating element with the power supply line are housed in a boss portion of the steering wheel.

A steering wheel in accordance with the present invention further comprises a temperature detection element for detecting the temperature of the heating element, a temperature detection element heater for heating the temperature detection element, and a temperature controller. The temperature detection element and the temperature detection element heater are housed in the boss portion of the steering wheel.

With the above-described structure, the connections do not protrude at the surface of a steering wheel, and therefore a driver does not have an uncomfortable feeling due to protrusions while handling the steering wheel. The temperature control is performed well and the steering wheel has a good appearance. Furthermore, a shape of a core for the steering wheel does not need to be changed depending on whether the heating element will be included, and thus, standard cores can be used in common for all steering wheels. Thereby, steering wheels can be provided at a low cost.

DETAILED DESCRIPTION OF THE INVENTION

Now in the following, description is made of the present invention referring to exemplary embodiments and FIGS. 1 through 13.

First Exemplary Embodiment

Figure 1:
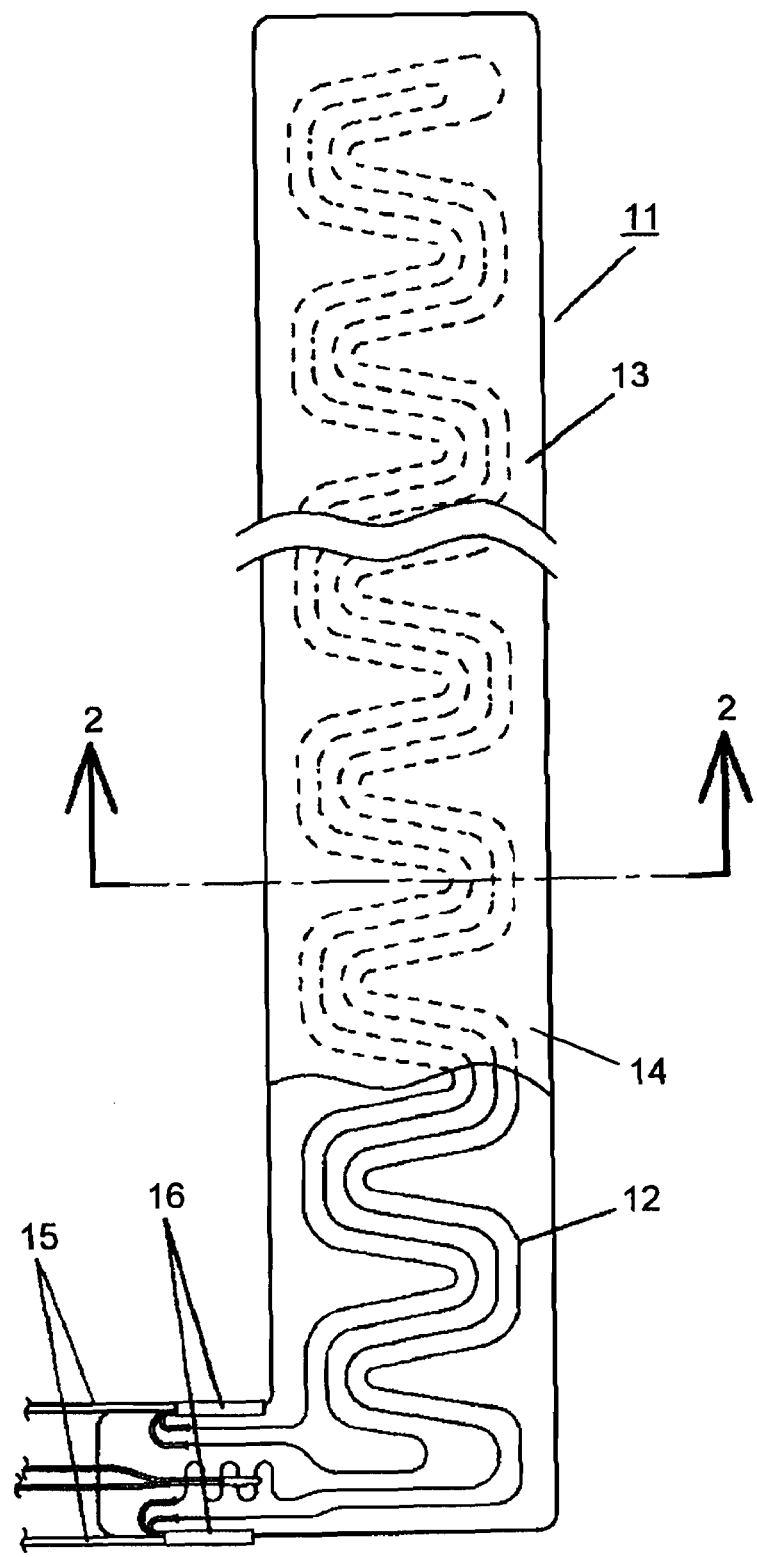
FIG. 1 is a plan view of a heating element in accordance with a first exemplary embodiment of the present invention.
Figure 2A:
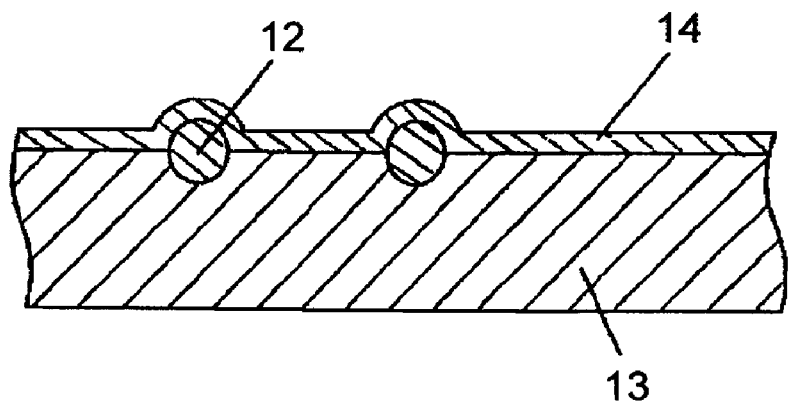
FIG. 2A and FIG. 2B are cross sectional views of the heating element in the first embodiment.
Figure 2B:
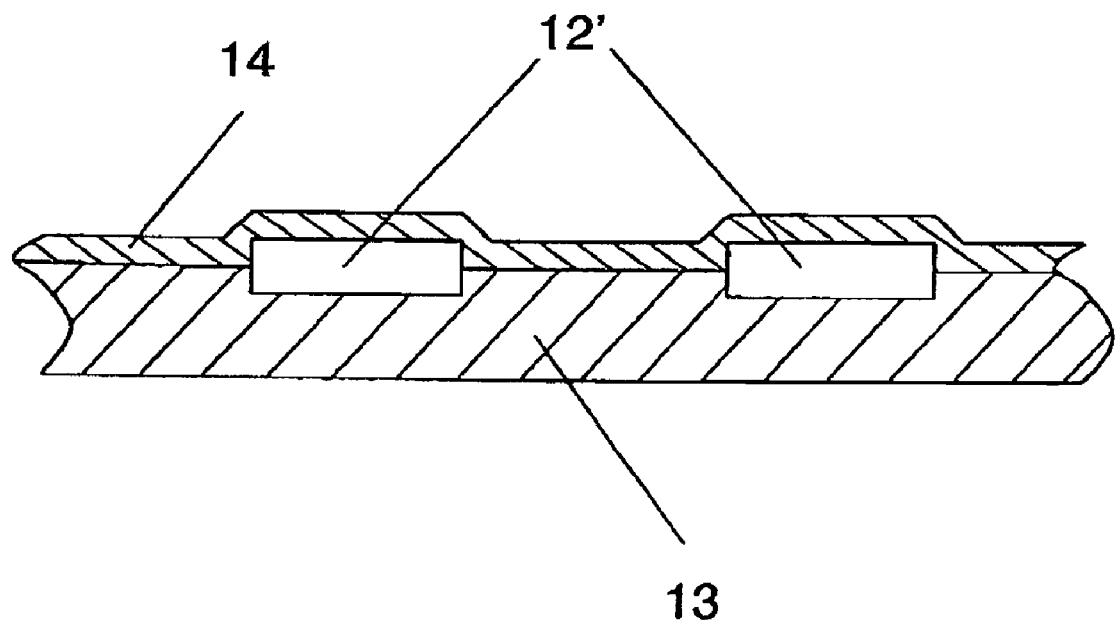
Figure 3:
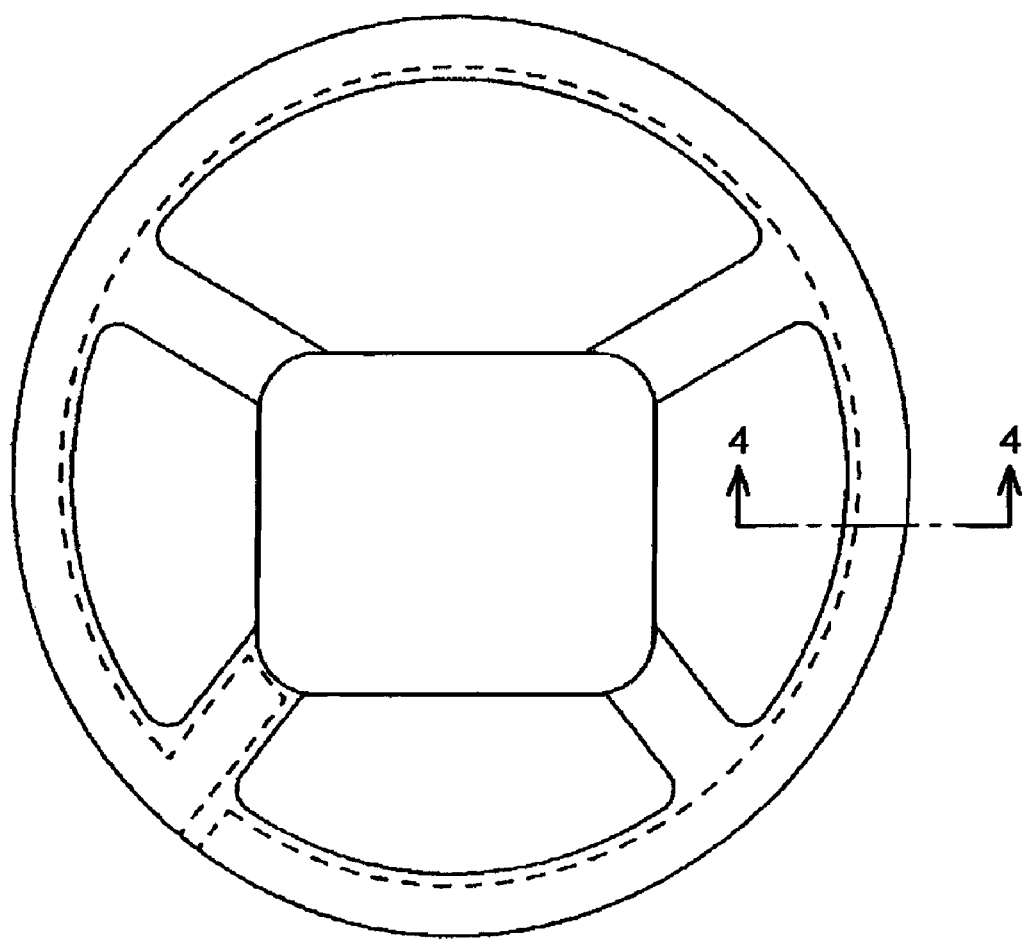
FIG. 3 is a plan view of a steering wheel in accordance with the first exemplary embodiment of the present invention.
Figure 4:
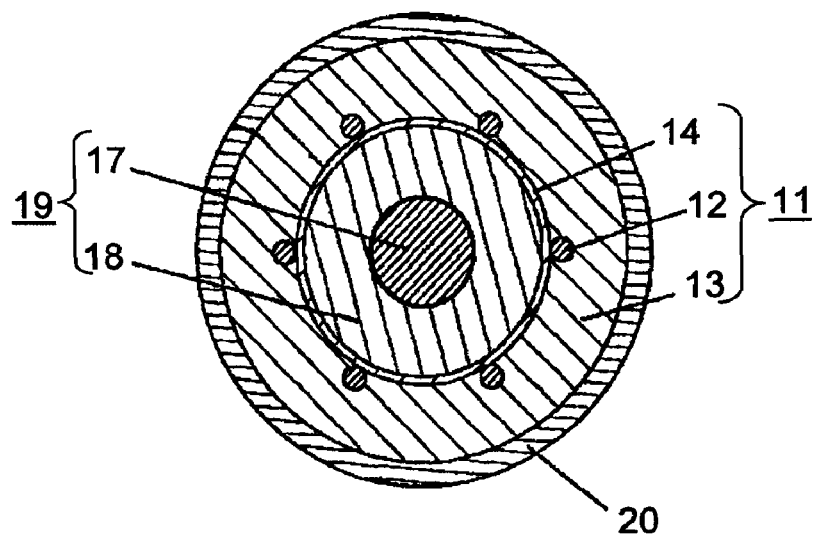
FIG. 4 is a cross sectional view of the steering wheel in the first embodiment.
Figure 5:
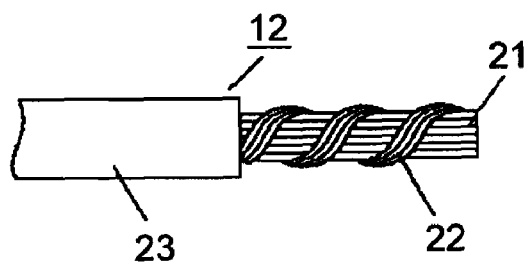
FIG. 5 shows a structure of a linear heater in accordance with the first exemplary embodiment of the present invention.

FIG. 1 is a plan view showing a heating element in accordance with an exemplary embodiment of the present invention. FIG. 2A and FIG. 2B show cross sectional views sectioned along the line 2-2 of FIG. 1. FIG. 3 is a plan view of a steering wheel equipped with the heating element. FIG. 4 shows a cross sectional view sectioned along the line 4-4 of FIG. 3. FIG. 5 shows an exemplary structure of a linear heater used in the heating element.

Referring to FIG. 1 and FIG. 2A, a heating element in the present invention comprises a base material 13, a protection layer 14 and a linear heater 12 sandwiched between the above two items. As shown in FIG. 2A, a back surface of the base material 13, which is not in contact with the linear heater 12, is not affected by a shape of the linear heater 12 and is maintained free of a protrusion due to a presence of the linear heater 12. The base member 13 is made of a non-woven fabric or a foamed resin such as foamed urethane, foamed polyethylene or the like. The protection layer 14 is made of a woven cloth, a non-woven spunbond fabric, a non-woven fabric or the like material, and covers at least linear heater 12. Base member 13 and protection layer 14 are bonded together with an adhesive or by means of a hot-melt layer.

The linear heater 12 is connected with power supply lines 15 at two connections 16 by soldering, spot welding or the like method.

Referring to FIG. 4, a heating element 11 is provided on a core 19, which comprises a core metal 17 and a cover layer 18 of hard urethane or the like material, and the heating element 11 is covered with a thin steering wheel cover 20 of a synthetic resin sheet, leather and or the like material.

Referring to FIG. 5, the linear heater 12 comprises a core thread 21 of polyester fiber or the like material for reinforcing the mechanical strength, a plurality of conductors 22 made of copper, copper alloy, stainless steel or the like, and an insulation layer 23 made of vinyl chloride resin, fluorocarbon resin or the like. Conductors 22 are wound around core thread 21, and the conductors 22 and the core thread 21 are covered with the insulation layer 23.

The operation and function of the above-configured heating element are described in the following.

The base material 13 is made of a non-woven fabric or a foamed resin such as foamed urethane, foamed polyethylene or the like, and can be deformed in shape so that at least a part of the linear heater 12 can sink into the base material 13 so as to be at least partially buried in the base material 13. A protrusion of the steering wheel cover 20 due to the presence of the linear heater 12 is prevented by the sinking of at least a part of the linear heater into the base material, even in a case where the linear heater 12 has a substantial thickness. As a thick linear heater can be used in accordance with the present embodiment, it has an increased durability against heavy loads.

In the structure of the present embodiment, the linear heater 12 which is harder than the cover layer 18 is disposed at the core side of the base material 13. As a result, even if the linear heater 12 is not entirely buried in the base material 13 of the heating element 11, the linear heater 12 will be sunk into the cover layer 18. Thus, a protrusion of the linear heater 12 at a surface of the steering wheel cover 20 is avoided.

Furthermore, since a linear heater is used for the heater in the present embodiment, the number of connections between the heater and the power supply lines can be reduced to two points. As compared with the conventional structure, where a heater having a lot of connection points is used, the heater in the present embodiment can be connected with the power supply lines easily and with a high reliability.

Although the present embodiment is described as including the heater 12 whose shape is linear, the present invention is not limited to the linear heater. Instead, as shown in FIG. 2B, a planar heater 12', for example, made of a metal foil, conductive polymers and or the like may be used.

Second Exemplary Embodiment

Figure 6:
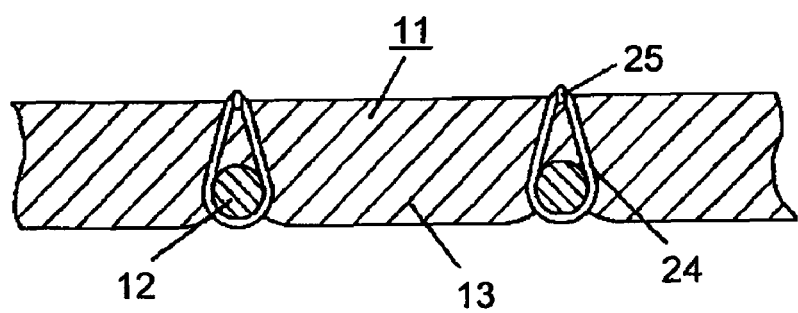
FIG. 6 is a cross sectional view of a heating element in accordance with a second exemplary embodiment of the present invention.

A heating element in a second exemplary embodiment is described with reference to FIG. 6.

The point of difference of the present embodiment with respect to the first embodiment is that a linear heater 12 has been buried in the base material 13, while a top thread 24 and a bottom thread 25 are used during a sewing operation to support the linear heater 12.

The operation and function of the above-configured heating element are described in the following.

The linear heater 12 in the present embodiment is buried in the base material 13 by making use of a pulling force of sewing threads, that are the top thread 24 and the bottom thread 25 used during the sewing operation. In this way, even a linear heater that is thicker than that in the first embodiment can be used without causing a protrusion at the surface of the steering wheel cover 20. The use of the linear heater 12 of an increased diameter contributes to an enhanced capability of the heater to withstand a heavier load. Furthermore, as the linear heater 12 is fixed firmly in the base material 13, the entire heating element 11 has a good stability with respect to its shape. Therefore, the heating element 11 can be attached easily around core 19, or steering wheel cover 20, of a steering wheel.

Third Exemplary Embodiment

Figure 7:
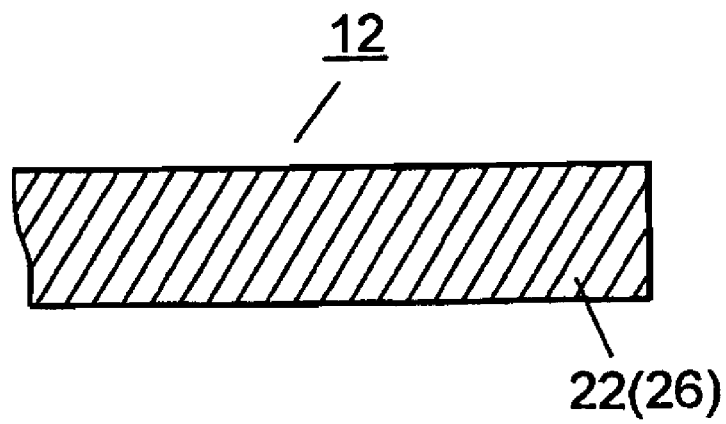
FIG. 7 shows a structure of a linear heater in accordance with a third exemplary embodiment of the present invention.

FIG. 7 is a plan view of a linear heater of a heating element for a steering wheel in accordance with a third exemplary embodiment of the present invention. A linear heater 12 in the present embodiment employs a stranded wire made of a plurality of conductors 22.

The operation and function of the above-configured heating element are described in the following.

A flat linear heater 12 can be obtained by stranding a plurality of conductors 22. With this structure, the thickness of the linear heater 12 can be reduced and, as a result, a thinner base material 13 can be used. Therefore, the difference in a level of the steering wheel surface can be reduced between an area having the heating element and an area without it.

Mechanical strength of the linear heater 12 in the present embodiment can be further increased if it is made of metal fiber reinforced alloy wires. This enables a further reduction of a thickness of the linear heater 12 and a thickness of the base material 13. As a result, the difference in the level of the steering wheel surface can be made less significant.

If the conductor 22 is provided with a plating layer 26, the anti-moisture property, the anti-corrosion property, as well as the solderability are enhanced. Hardness of the heater surface is also increased. This contributes to prevention of possible damage to the heater when it is buried in the base material 13. Examples of materials for the plating layer include copper, tin, nickel and alloys thereof.

If the conductor 22 is provided with an insulating coating, the anti-moisture property and the anti-corrosion property can be further enhanced. If the insulating coating is colored so that each type of heater is specifically colored in a different color, different types of linear heaters can be easily identified.

Fourth Exemplary Embodiment

Figure 8:
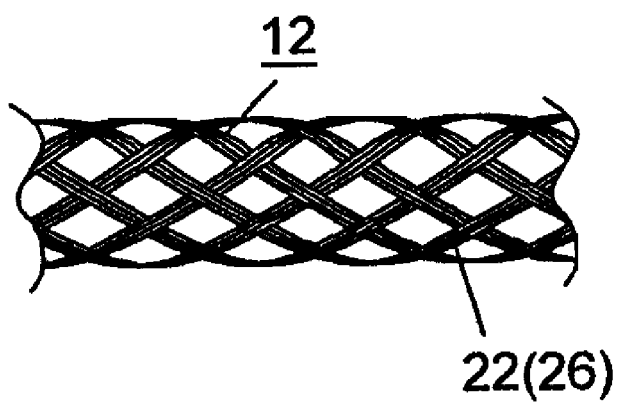
FIG. 8 shows a structure of a linear heater in accordance with a fourth exemplary embodiment of the present invention.

FIG. 8 is a plan view of a linear heater of a heating element in a fourth exemplary embodiment of the present invention. The linear heater 12 of the present embodiment employs braided conductors 22.

The operation and function of the above-configured heating element for a steering wheel are described in the following.

When a plurality of conductors 22 are braided into the linear heater 12, the linear heater can be made more flat-shaped and thinner. A thickness of a base material 13 can also be reduced further, and the difference in the level of the steering wheel surface between areas having the heating element and areas without the heating element can be further reduced.

The advantages resulting from the use of metal fiber reinforced alloy wires, the plating layer on respective conductors 22 and the insulation layer provided on respective conductors 22, as obtained in the third exemplary embodiment, can also be obtained in the present embodiment.

Fifth Exemplary Embodiment

Figure 9:
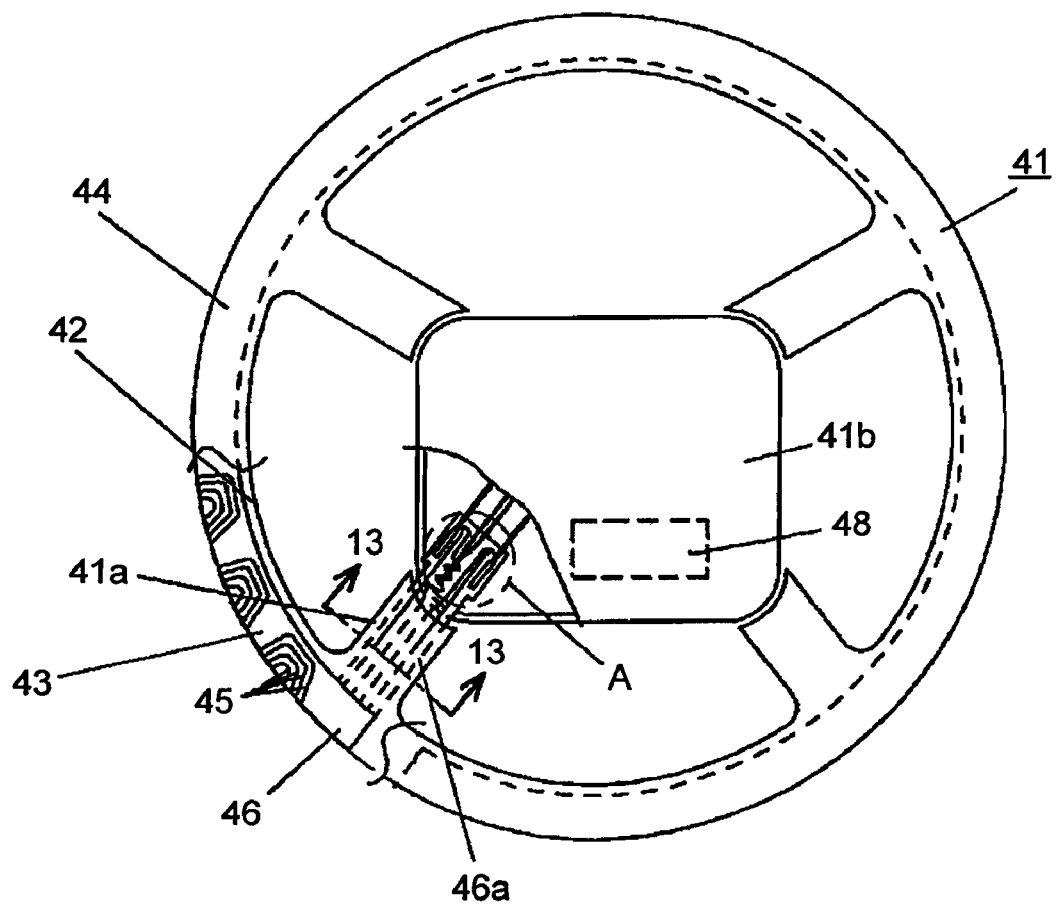
FIG. 9 is a plan view of a steering wheel in accordance with a fifth exemplary embodiment of the present invention.
Figure 10:
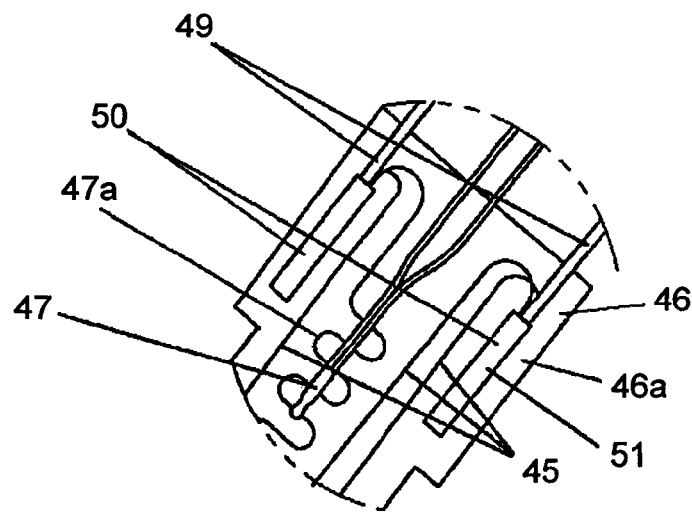
FIG. 10 is a magnified partial view of the steering wheel in the fifth embodiment.

FIG. 9 shows a plan view of a steering wheel in accordance with a fifth exemplary embodiment of the present invention. FIG. 10 is a magnified view of portion A of FIG. 9.

Referring to FIG. 9, a heating element 43 is provided on a core 42 of a steering wheel 41. A steering wheel cover 44 made of leather, synthetic leather or the like covers the heating element 43. The heating element 43 comprises a linear heater 45 sewn to a base material 46. The base material 46 is made of a non-woven fabric or a foamed resin such as foamed urethane, foamed polyethylene or the like. In the present embodiment, at least one end portion 46a of the base material 46 extends over a spoke 41a of the steering wheel 41 to reach inside of a boss portion 41b.

Referring to FIG. 10, a thermistor 47 for detecting a temperature of the heating element 43, a heater 47a for heating the thermistor, power supply lines 49 for supplying electric power to the linear heater 45 and connections 50 connecting the linear heater 45 and the power supply lines 49 are provided at the end portion 46a of the base member 46. The end portion 46a and a temperature controller 48 are housed in the boss portion 41b.

The thermistor 47 and the connections 50 are fixed to the base material 46 with an adhesive, an adhesive tape or the like.

The linear heater 45 and the power supply lines 49 are connected together at the connections 50 by soldering, spot welding or the like method and are insulated by heat shrinkable tubings 51 or the like means.

The operation and function of the above-configured steering wheel 41 are described in the following.

In the present embodiment, portions which tend to cause protrusions such as the connections 50 of the linear heater 45 and the power supply lines 49, and the thermistor 47, are disposed within the boss portion 41b. As a result, the connections 50 do not protrude at the surface of the steering wheel 41, so a driver does not feel uncomfortable, and the steering wheel 41 has a good appearance. Furthermore, the shape of the core 42 does not need to be changed depending on whether the heating element is to be included. Thus, a common core of standard design can be used, and thus, the steering wheels 41 can be provided at a low cost.

Furthermore, in the present embodiment, a part of the linear heater 45 of the heating element 43 is used as a heater 47a for heating the thermistor 47. The temperature of a heating element 43 is controlled by comparing the temperature of the thermistor 47 with a predetermined temperature, and by controlling the power supply to the linear heater 45 and the heater 47a for heating the thermistor. Temperature control in the present embodiment is conducted by repeating ON/OFF operations. Since a correlation between the temperatures of the thermistor 47 and the heating element 43 was previously studied and is established in the present embodiment, the thermistor 47 and the heater 47a for heating the thermistor can be housed inside of the boss portion 41b.

As described above, as the thermistor 47 and the heater 47a for heating the thermistor are housed inside of the boss portion 41b, these components are not gripped by a driver. Thus, the thermistor 47 can detect a stable temperature for the stable temperature control of the heating element 43. Further, the thermistor does not protrude at the surface of the steering wheel. Furthermore, design of the core 42 does not need to be changed depending on the existence of the heating element 43, and therefore a common core 42 of standard design can be used.

Although a shape of the heater 45 of the present embodiment is described as a linear-shaped, the present invention is not limited to the linear-shape. A planar heater, for example, may be used as the heater 45.

Although the thermistor 47 is used for the temperature detection in the present embodiment, a thermal sensitive resistor sensor such as a platinum temperature sensor, a nickel temperature sensor or the like, or other known temperature detection elements may be used instead.

Sixth Exemplary Embodiment

Figure 11:
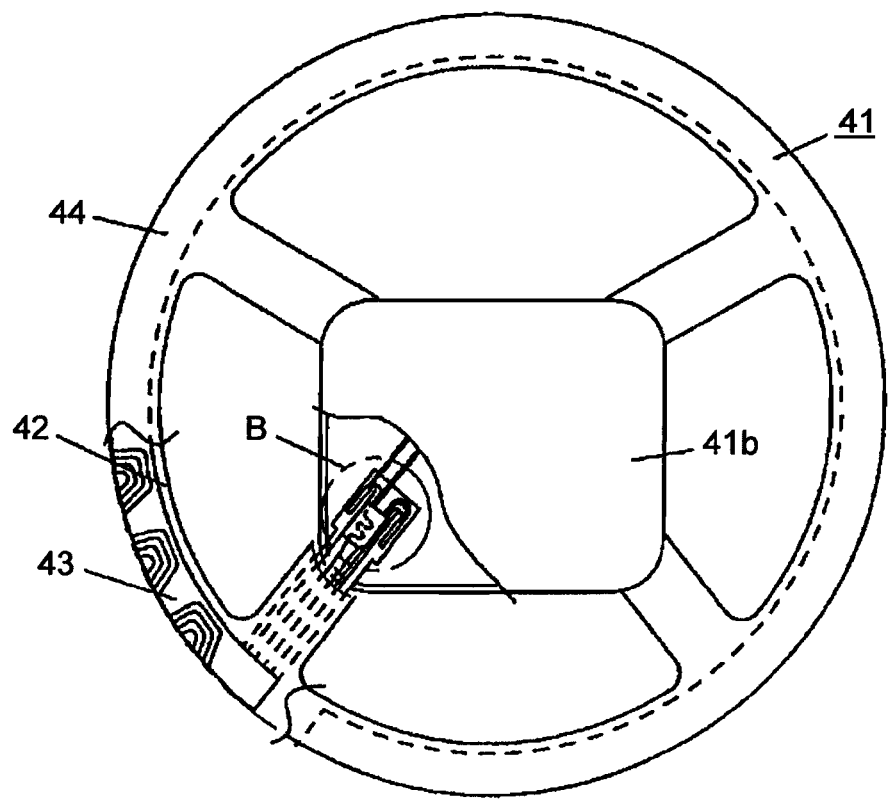
FIG. 11 is a plan view of a steering wheel in accordance with a sixth exemplary embodiment of the present invention.
Figure 12:
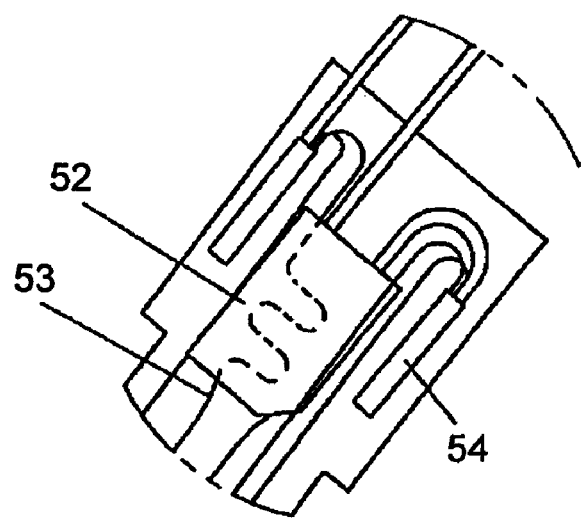
FIG. 12 is a magnified partial view of the steering wheel in the sixth embodiment.

FIG. 11 shows a plan view of a steering wheel in accordance with a sixth exemplary embodiment of the present invention. FIG. 12 shows a magnified view of part B of FIG. 11.

Referring to FIG. 11 and FIG. 12, the point of difference as compared with the structure in the fifth exemplary embodiment is that a temperature controller comprises a thermostat 52 and a heater 53 for heating the thermostat. The heater 53 for heating the thermostat is provided by using a part of the linear heater 45 disposed beneath the thermostat 52. The thermostat 52, the heater 53 for heating the thermostat and the linear heater 45 are connected in series.

In the present embodiment, the thermostat 52, the heater 53 for heating the thermostat, and the connections 50 connecting the thermostat 52 and the heater 53 for heating thermostat are housed within the boss portion 41b.

The operation and function of the above-configured steering wheel are described in the following.

When electric power is supplied to the heating element 43, the linear heater 45 and the heater 53 for heating the thermostat generate heat, and then the thermostat 52 is heated by the heater 53 for heating the thermostat. After a certain amount of time has passed, the thermostat 52 is turned off. Since the thermostat 52 is connected in series with the heater 53 for heating the thermostat, the heater 53 for heating the thermostat does not received power from the power supply while the thermostat 52 is in an OFF state. Then, the unheated thermostat 52 cools down, and returns to an ON state after a certain time period. The temperature of the linear heater 45 of heating element 43 is controlled through the ON/OFF repetition of power being supplied to the heater from the power supply.

By employing a structure where the heater 53 for heating the thermostat is provided by using a part of the linear heater 45 disposed underneath the thermostat 52, and the heater 53 for heating the thermostat and the linear heater 45 are connected in series, the thermostat 52 and the heater 53 are disposed within the boss portion 41b.

Because the thermostat 52 and the heater 53 for heating the thermostat are housed within boss portion 41b, and the thermostat 52 is not gripped by a driver, the temperature of thermostat 52 rises in a stable manner for a stable temperature control.

Further, in the structure of the present embodiment, the thermostat 52 does not make a protrusion on the surface of the steering wheel 41, so a driver does not feel uncomfortable, and the steering wheel 41 with a good appearance is provided. Furthermore, a shape of the core 42 does not need to be changed depending on whether a heating element is to be included. Thus, a common core of standard design can be used.

Still further, the temperature control in the present embodiment is controlled with fewer components, as compared to a method of temperature control with a thermistor and a temperature controller. This helps to further reduce the cost of the steering wheels.

A linear heater made of woven wire of a plurality of conductors 22 as shown in FIG. 8 of the fourth embodiment can also be used in the present embodiment and in the fifth embodiment.

When the linear heater 45 in the present embodiment is provided by using metal fiber reinforced alloy wires, a mechanical strength of the linear heater 45 placed between the spoke 41a and the boss portion 41b of the steering wheel 41 is increased, and a durability of the linear heater 45 between the spoke 41a and the boss portion 41b is improved. This prevents a breakdown of the linear heater 45.

Seventh Exemplary Embodiment

Figure 13:
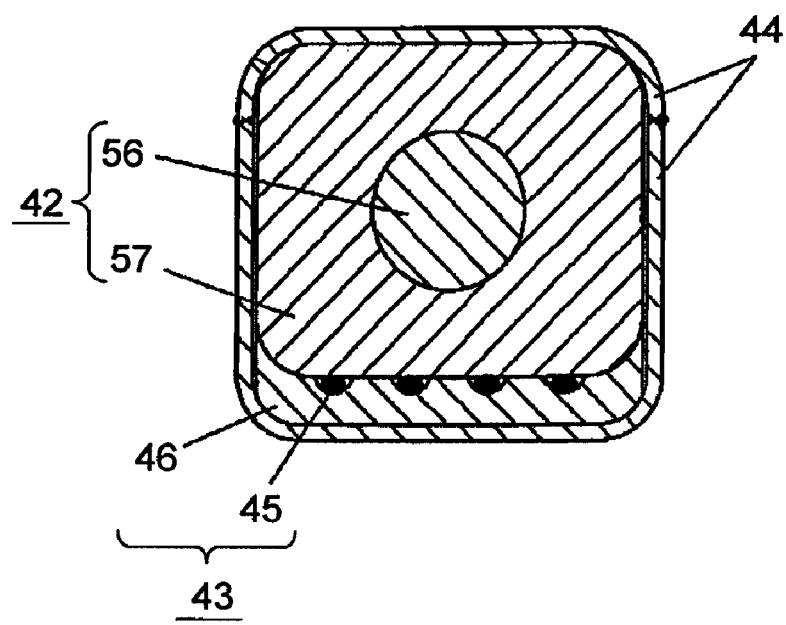
FIG. 13 is a magnified cross sectional view of the steering wheel in accordance with a seventh exemplary embodiment of the present invention.
Figure 14:
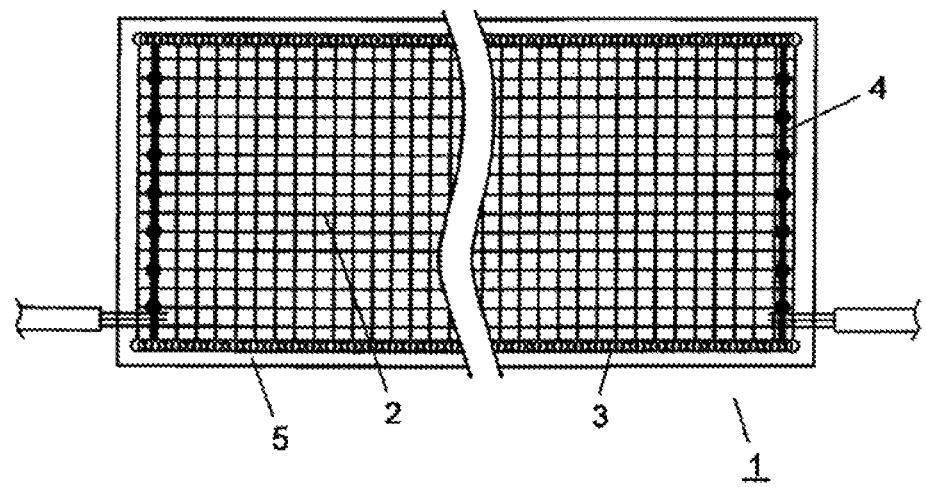
FIG. 14 is a plan view of a conventional heating element.
Figure 15:
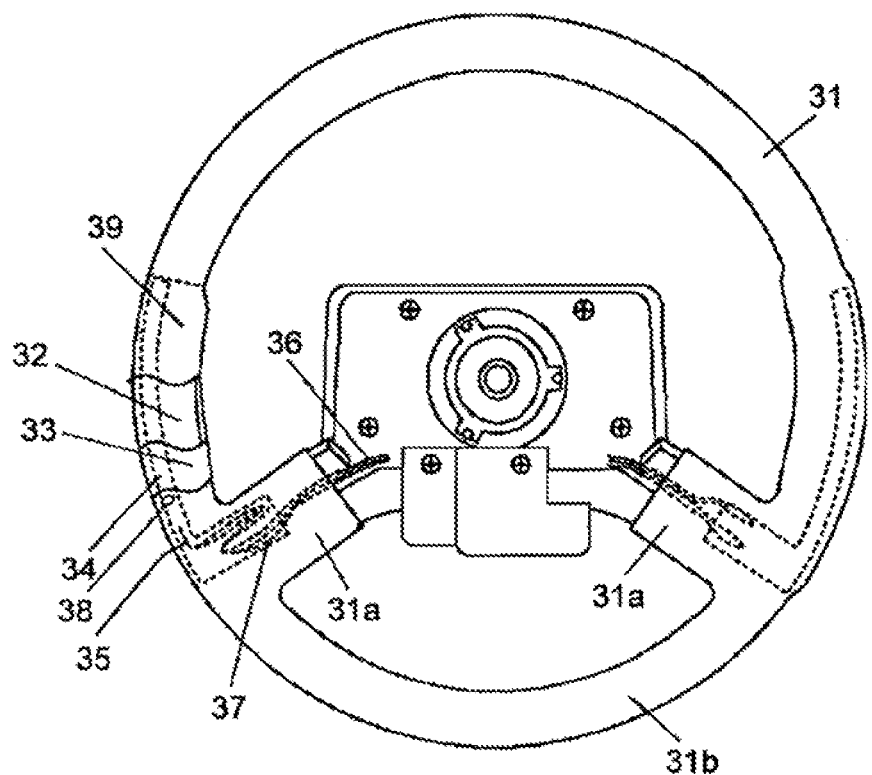
FIG. 15 is a plan view of a conventional steering wheel.

FIG. 13 shows a cross sectional view of a spoke 41a of a steering wheel 41 in accordance with the present exemplary embodiment, sectioned along the line 13-13 of FIG. 9.

Referring to FIG. 13, a core 42 of the spoke 41a comprises a core metal 56 and a cover 57 made of hard urethane or the like material formed on the core metal 56. A linear heater 45 and a base material 46 of a heating element 43 are mounted to the core cover 57, in this order, and these are covered by a steering wheel cover 44.

The operation and function of the above-configured steering wheel are described in the following.

As the linear heater 45 and the base material 46 are disposed around the steering wheel 41 and the spoke 41a, in this order towards the outer periphery in the cross section, the linear heater 45 is not exposed in an area between the spoke 41a and the boss portion 41b. As a result, the durability of linear heater 45 between the spoke 41a and the boss portion 41b is increased, and possible breakdown of the linear heater 45 between the spoke 41a and the boss portion 41b can be prevented.

If conductors of the linear heater 45 are plated like in the third embodiment, the same advantages are also obtained in the present embodiment. The durability of linear heater 45 between the spoke 41a and the boss portion 41b can be further increased.

If the conductors of the linear heater 45 are provided with an insulating coating, the anti-moisture property and the anti-corrosion capability is increased, and the surface hardness of the linear heater 45 can be increased. Thus, the durability of the linear heater 45 between the spoke 41a and the boss portion 41b is further increased.

As described above, the present invention provides a heating element for a steering wheel, that has a high durability and does not have protrusions at a surface of a cover material of the steering wheel.

When the heating element of the present invention is used for a steering wheel, connections of a heater in the heating element and the like components do not cause protrusions on a surface of the steering wheel. So, a driver handling the steering wheel does not have an uncomfortable feeling, and a steering wheel has a good appearance. Furthermore, the design of the core for the steering wheel does not need to be changed depending on whether the heating element will be included, and a standard core can be used in common for all steering wheels. Thereby, the steering wheels can be provided at a low cost.

What is claimed is:

1. A steering wheel comprising:
   a heating element including a base material and a first heater provided at said base material;
   a steering wheel core having said heating element mounted thereto;
   a power supply line to supply electric power to said heating element;
   a boss portion;
   a second heater disposed in said boss portion;
   a temperature detection element disposed in said boss portion and being arranged to be heated by said second heater and to detect a temperature of said second heater; and a temperature controller operable to control a temperature of said first heater based on information from said temperature detection element, wherein said second heater is integrally formed with the first heater, wherein said heating element and said power supply line are connected together at a connection, wherein said connection is disposed in said boss portion, and wherein said base material of said heating element has a first surface facing said steering wheel core and a second surface facing away from said steering wheel core, and said first heater is at least partially buried in said first surface of said base material.

2. The steering wheel of claim 1, wherein said temperature detection element is one of a thermistor, a thermostat and a thermal sensitive resistor sensor.

3. The steering wheel of claim 1, wherein
said temperature detection element comprises a thermostat;
said thermostat and said second heater are connected together at a connection; and
said connection is disposed in said boss portion.

4. The steering wheel of claim 1, wherein
said temperature detection element comprises a thermostat; and
said thermostat, said second heater and said first heater are connected in series.

5. The steering wheel of claim 1, wherein said heating element further includes a protection layer provided on said first heater and said base material such that said first heater is interposed between said base material and said protection layer.

6. The steering wheel of claim 1, wherein said heating element is disposed about said steering wheel core.

7. The steering wheel of claim 6, further comprising a steering wheel cover provided about said heating element.

8. The steering wheel of claim 1, further comprising a steering wheel cover provided about said heating element.

9. The steering wheel of claim 1, wherein a deformable material of said base material comprises one of a non-woven fabric and a foamed resin.

10. The steering wheel of claim 1, wherein a thickness of said base material is larger than a thickness of said first heater.

* * * * *